United States Patent [19]

Brooks

[11] 4,171,469
[45] Oct. 16, 1979

[54] ABBREVIATED DIALING SYSTEM

[76] Inventor: Fred E. Brooks, P.O. Box 2529, Orlando, Fla. 32802

[21] Appl. No.: 900,587

[22] Filed: Apr. 27, 1978

[51] Int. Cl.² ............................................. H04M 3/44
[52] U.S. Cl. ............................... 179/18 BA; 179/90 B
[58] Field of Search ........................ 179/18 BA, 90 B

[56] References Cited
U.S. PATENT DOCUMENTS

| 3,334,190 | 8/1967 | Jenkins et al. | 179/18 BA |
| 3,993,877 | 11/1976 | Sendyk et al. | 179/90 B |

Primary Examiner—William C. Cooper
Attorney, Agent, or Firm—Duckworth, Hobby & Allen

[57] ABSTRACT

An abbreviated dialing system is connected in series with a telephone line connecting one or more subscriber telephone instruments to the telephone central office. This system incorporates either a low pass or other filter which prevents the transmission of Touch Tone signals from any subscriber telephone instrument to the telephone central office, but has negligible effect on the D.C. voltage, ring signal or dial tone signal sent out over the telephone line from the central office to the subscriber telephone equipment. A filter control circuit is controlled by logic circuitry to selectively either bypass the filter or insert it in series with the telephone line. When the subscriber lifts the handset of a telephone instrument, the filter is inserted in series with the telephone line. The subscriber then transmits an abbreviated series of Touch Tone signals which are intercepted and decoded by the system's logic circuitry. A decoded Touch Tone signal is generated and transmitted by the system to the central office which rings the telephone designated by the full sequence Touch Tone signal. Upon completion of this transmission, the filter control circuitry switches the filter out of the circuit to permit normal operation of the telephone system. In this manner a plurality of subscriber telephone instruments can access and control a single abbreviated dialing system. No modification of any of the existing subscriber telephone instruments or premises wiring is necessary.

29 Claims, 5 Drawing Figures

ABBREVIATED DIALING SYSTEM

BACKGROUND OF THE INVENTION

1. Field of the Invention

The present invention relates to telephone systems, and more particularly to abbreviated dialing systems for Touch Tone telephone instruments.

2. Description of the Prior Art

Equipment capable of providing an abbreviated dialing feature typically is installed as an attachment to a subscriber telephone instrument or is accomplished by a computerized system located at a telephone central office. At the present time, a relatively small percentage of telephone central offices have purchased the computer equipment required to provide an abbreviated dialing capability for its subscribers. Thus there is a substantial market for abbreviated dialing systems which can be either purchased or leased by a subscriber to provide an abbreviated dialing capability for one or more of his telephone instruments.

U.S. Pat. No. 3,993,877 (Sendyk) discloses an abbreviated dialing system which is inserted in series with a subscriber's telephone line to provide an abbreviated dialing capability for a single pulse dialed telephone instrument. With further circuitry a second telephone instrument can be coupled to the system. The electronic structure of this system requires that the DC loop current and dial tone to the telephone instrument be interrupted at certain times. The system apparently has the flexibility to add a second telephone extension, but cannot serve more than two instruments. When a second instrument is added, circuitry which is able to designate the controlling telephone must be added.

Another somewhat different abbreviated dialing system is disclosed in U.S. Pat. No. 3,917,911 (Lesher). The Lesher reference discloses a system which upon receiving a pulse dial input designating an apartment dweller's residence retransmits a full sequence telephone number corresponding to the telephone number of the selected apartment dweller. The circuit is extremely limited since it is only able to provide this service from a single non-standard telephone instrument and is incompatible with multi-frequency or Touch Tone dialing signals.

U.S. Pat. Nos. 4,053,718 (Dervaux), 4,010,330 (Shio) and 3,105,121 (Field) disclose various abbreviated dialing systems which are incorporated within a single telephone instrument. Devices of this type are structurally limited to serving only a single telephone instrument and are thus limited in their function and service with a subscriber having a plurality of telephone instruments. If the subscriber desires to have access to the abbreviated dialing system, he must utilize one of the specially equipped instruments and none other.

The following United States patents disclose other less relevant abbreviated dialing systems which are either located at a telephone central office or are limited in that they can serve only a single telephone instrument: U.S. Pat. Nos. 4,007,333 (Marheine), 3,325,602 (Truby), 3,334,190 (Jenkins et al), 3,194,890 (Haskins) and 3,702,905 (Gil).

SUMMARY OF THE INVENTION

It is therefore a primary object of the present invention to provide an abbreviated dialing system which will permit any number of subscriber telephone instruments coupled to a single telephone line to access and control a single abbreviated dialing system connected to that telephone line.

Another object of the present invention is to provide an abbreviated dialing system the memory of which can be readily reprogrammed from any remotely located telephone instrument.

Yet another object of the present invention is to provide an abbreviated dialing system which is substantially less expensive to manufacture than existing systems which permit access and control by only a single subscriber telephone instrument.

Still another object of the present invention is to provide an abbreviated dialing system which includes a battery which is recharged directly from the telephone line thus eliminating the necessity for external power.

Breifly stated, and in accord with one embodiment of the invention, an abbreviated dialing system generates a full sequence Touch Tone signal in response to an abbreviated Touch Tone signal transmitted from any one of a plurality of subscriber telephone instruments which are coupled to a single line from a telephone central office.

The system includes filter means having input terminal means coupled to the portion of the telephone line which connects the system to all subscriber telephone instruments and output terminal means which is coupled to the telephone line leading from the system to the telephone central office. The filter means prevents the transmission of Touch Tone signals from any subscriber telephone instrument to the telephone central office while passing direct current voltage, ring signals and dial tone signals from the telephone central office to the telephone instrument. Control logic means is coupled to a filter control means and to the input and output terminal means of the filter means. The control logic means actuates the filter control means to remove the filter means from the telephone line when an unabbreviated Touch Tone signal is received. When the control logic means detects an abbreviated Touch Tone signal, it decodes this abbreviated Touch Tone signal and generates a corresponding full sequence Touch Tone signal on the output terminal means of the filter means.

The filter control means is coupled to the control logic means and to the input and output terminal means of the filter means. The filter control means connects the filter means in series with the telephone line when any subscriber telephone instrument is activated for the purpose of making a telephone call. The filter control means also disconnects the filter means from the telephone line after a full sequence Touch Tone signal has been generated by the control logic means or whenever an unabbreviated Touch Tone signal is detected by the control logic means. Additionally, the filter control means disconnects the filter means from the telephone line whenever the telephone instrument is activated for the purpose of answering an incoming call.

In a more generalized version of the invention, an abbreviated dialing system includes first means coupled to the telephone line conductors which extend between the telephone instrument and the telephone central office for transmitting DC voltage, dial tone signals and ringing signals along the telephone line conductors and for suppressing transmission of Touch Tone dialing signals along the telephone line conductors. The system also includes second means coupled to the first means for receiving Touch Tone dialing signals from the telephone instrument, reformatting selected ones of the Touch Tone dialing signals and thereafter transmitting the reformatted touch tone dialing signals along the line conductors to the central office.

DESCRIPTION OF THE DRAWING

The invention is pointed out with particularity in the appended claims. However, other objects and advantages together with the operation of the invention may be better understood by reference to the following detailed description taken in connection with the following illustrations wherein:

DESCRIPTION OF THE PREFERRED EMBODIMENT

In order to better illustrate the advantages of the invention and its contribution to the art, a preferred hardware embodiment of the invention will now be described in some detail.

Figure 1:
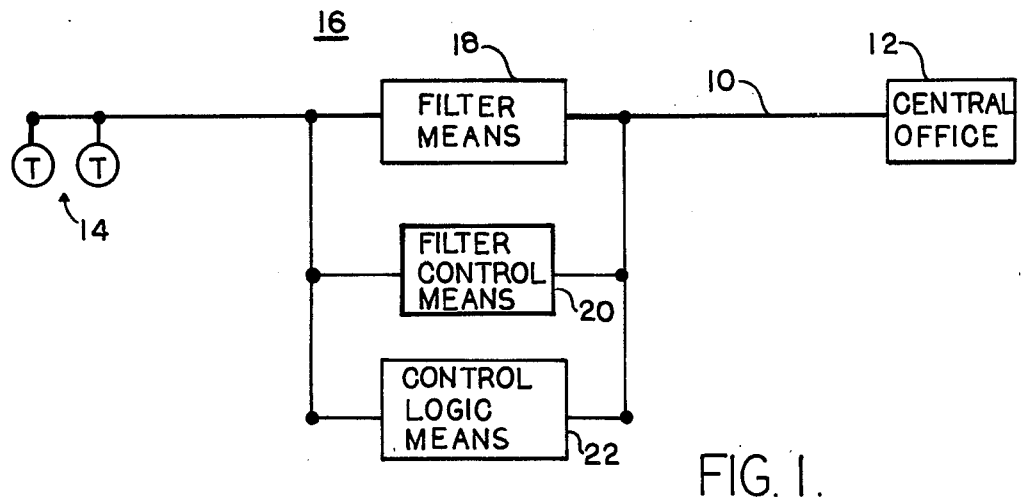
FIG. 1 is a highly simplified block diagram of an abbreviated dialing system of the present invention.

Referring now to FIG. 1, the abbreviated dialing system 16 of the present invention is inserted in series with a telephone line 10 which extends from a central office 12 to one or more subscriber telephone instruments 14.

Abbreviated dialing system 16 can be inserted anywhere along telephone line 10. It can be positioned in the telephone central office 12 or in the subscriber's residence or office. For the purpose of the following discussion it will be assumed that system 16 is positioned in the subscriber's residence or place of business.

FIG. 1 illustrates that the basic elements of the abbreviated dialing system of the present invention include filter means 18, filter control means 20 and control logic means 22.

Figure 2:
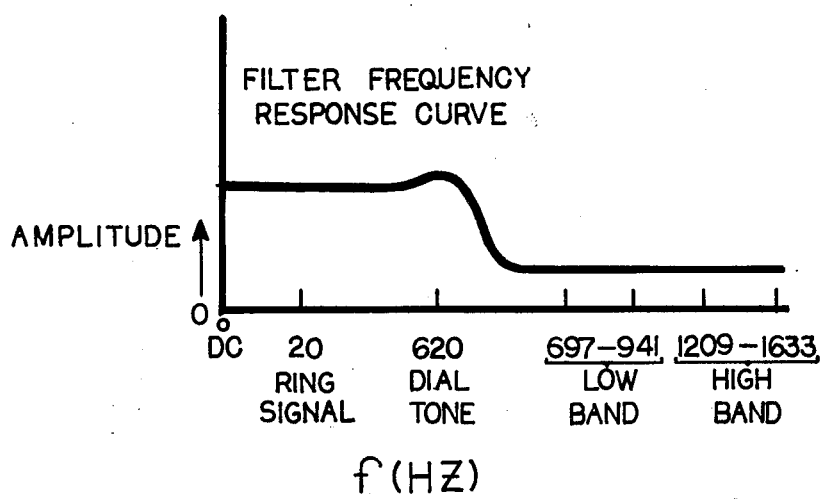
FIG. 2 illustrates one possible filter frequency response curve of a filter of the present invention.

FIG. 2 illustrates one possible frequency response curve of filter means 18. When filter means 18 is coupled directly in series with telephone line 10, it prevents the transmission of Touch Tone signals from any telephone instrument to the telephone central office at a level sufficient to actuate central office equipment. The frequencies of the Touch Tone signals generated by a Touch Tone equipped telephone instrument lie either within the low Touch Tone band (697-941 Hertz) or within the high Touch Tone band (1209-1633 Hertz). Depressing any one of the twelve available keys on a Touch Tone equipped telephone instrument generates two Touch Tone frequencies, one from the low band and one from the high band. The Touch Tone receiving equipment in the telephone central office 12 will intentionally not function unless both the low band and high band Touch Tone frequencies transmitted by actuation of a single key have been received at appropriate levels.

Inserting filter means 18 in series with telephone line 10 causes both the low band and high band Touch Tone frequencies to be severely attenuated. However, even when filter means 18 is switched into the telephone line, a subscriber can still hear a normal dial tone signal including the 620 Hertz component. If a distant subscriber desires a call one of the subscriber telephone instruments 14, the 20 Hertz ring signal will readily pass through filter means 18. The direct current which normally flows through telephone line 10 whenever one of the telephone instruments 14 is taken off hook will flow normally through filter means 18 as the result of the frequency response curve illustrated in FIG. 2. Since the insertion of a low pass filter in a line will normally slightly attenuate even the frequencies within the filter pass band, filter means 18 is designed to have a peak at around the 620 Hertz dial tone component in order to minimize the amount of attenuation of this particular signal which a telephone user should hear prior to initiating a phone call.

Since the DC voltage on telephone line 10 also powers the Touch Tone frequency generators in telephone instrument 14, this source of power will always be available whenever the receiver is taken off hook even though filter means 18 is switched into the circuit.

In the preferred embodiment the Touch Tone keys designated "*" and "#" are utilized to control the operation of the abbreviated dialing system. When a subscriber depresses the "*" key, as the first digit dialed, the system is notified that an abbreviated Touch Tone signal is being transmitted. Depressing the "#" key in a predetermined sequence informs the system that its memory is about to be reprogrammed. Depressing any other of the keys designated "0-9" as the first digit dialed indicates to the system that a normal manually dialed or unabbreviated Touch Tone signal is being transmitted by the subscriber. In this latter situation, filter control means 20 is actuated by control logic means 22 to switch filter means 18 out of the telephone line thus allowing a Touch Tone signal of normal amplitude to be transmitted to the central office.

Figure 3:
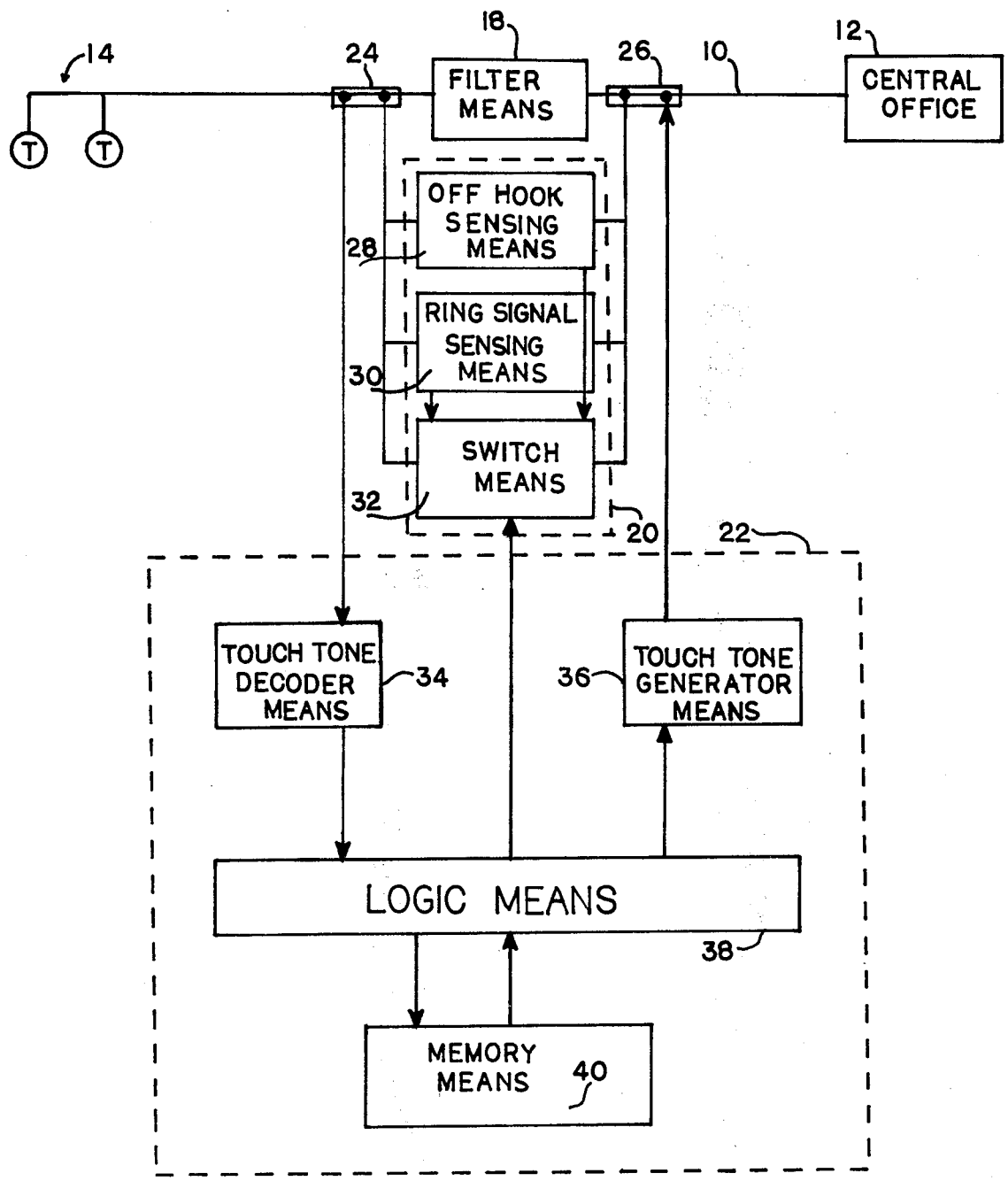
FIG. 3 is a more detailed block diagram of an abbreviated dialing system of the present invention.

The operation of the system will now be discussed in greater detail by referring to FIG. 3. Filter means 18 includes input terminal means 24 and output terminal means 26 coupled directly in series with telephone line 10 which is schematically illustrated as a single wire for simplicity. Filter control means 20 includes off hook sensing means 28, ring signal sensing means 30 and switch means 32. Switch means 32 has two states. When switch means 32 creates an open circuit state, filter means 18 is inserted in series with telephone line 10; when switch means 32 creates a closed circuit state, a short circuit is formed between input terminal means 24 and output terminal means 26 removing filter means 18 from telephone line 10. This short circuit state can be created either electrically or mechanically by switch means 32.

Off hook sensing means 28 generates a single output signal which controls the operation of switch means 32. When off hook sensing means 28 senses that none of the telephone instruments 14 is off hook, switch means 32 is actuated to remove filter means 18 from telephone line 10. Whenever any telephone instrument 14 is taken off hook, off hook sensing means 28 switches filter means 18 in series with telephone line 10 by merely causing switch means 32 to assume the open circuit state.

Control logic means 22 includes Touch Tone decoder means 34, Touch Tone generator means 36, logic means 38 and memory means 40. When any of the telephone receivers 14 is taken off hook, off hook sensing means 28 actuates switch means 32 to insert filter means 18 in series with telephone line 10. If the subscriber then keys an abbreviated Touch Tone signal such as "* 7 3", Touch Tone decoder means 34 receives this signal from input means 24 and converts it to a digital input signal which is sent to logic means 38. The initial "*" Touch Tone signal indicates to logic means 38 that the following two digits will be an abbreviated dialing command. The digits "73" indicate to logic means 38 that the telephone number which the subscriber desires to have dialed automatically is stored in memory address 73 of memory means 40. In the preferred embodiment of the invention memory means 40 has the capability of storing telephone numbers up to fifteen digits in length. Since most local telephone calls are only seven digits in length, a typical abbreviated Touch Tone input signal will cause the abbreviated dialing system to generate a reformatted sequence of seven Touch Tone output signals.

Logic means 38 reads out the digital information stored in memory means address "73" and transmits this digital output signal to Touch Tone generator means 36 which converts this digital output signal into the desired sequence of Touch Tone frequency signals. These Touch Tone frequency signals are coupled to output terminal means 26 for transmission along telephone line 10 to central office 12. A stop character is stored in the position following the last stored digit of a telephone number. When logic means 38 reads out the stop character, a master reset signal is sent to switch means 32 causing it to assume the short circuit state and thereby eliminate filter means 18 from the telephone line. When the called party answers his telephone, the two parties will be able to converse normally since filter means 18 will have been automatically removed from the circuit by the master reset signal.

Had the subscriber depressed any of the touch tone keys "0-9" initially, logic means 38 would have detected the absence of the initial "*" Touch Tone signal indicative of an abbreviated dialing command and would have in a matter of milliseconds actuated switch means 32 to remove filter means 18 from the telephone line 10. Thus the entire manually dialed unabbreviated signal bypasses the abbreviated dialing system and is directly transmitted from the subscriber telephone instrument to central office 12. In the preferred embodiment, the "#" key is used to indicate a memory reprogramming command to logic means 38. The next two digits transmitted by the subscriber to the system will be accepted by logic means 38 as the memory address which is to be reprogrammed. If the user wishes to reprogram the telephone number stored in memory address "56", he must dial the following series of signals: "#56" The next group of up to fifteen digits dialed will be accepted by logic means 38 and stored in memory address "56" of memory means 40. The subscriber then hangs up the particular telephone instrument utilized, a stop character is automatically inserted in memory means 40 and the abbreviated dialing system will revert to normal operation.

Ring signal sensing means 30 is provided to prevent filter means 18 from being inserted in series with telephone line 10 when a subscriber takes one of his telephone instruments off hook in response to an incoming telephone call. Ring signal sensing means 30 overrides off hook sensing means 28 and maintaines switch means 32 in a short circuit condition whenever one of the telephone instruments 14 is taken off hook within six seconds after a ring signal has been detected by ring signal sensing means 30. In this manner, the abbreviated dialing system does not insert filter 18 into the circuit when a subscriber telephone instrument is taken off hook in response to an incoming phone call. This arrangement is necessary since switching filter means 18 into the telephone line would filter out audio frequencies and render conversation difficult.

Figure 4:
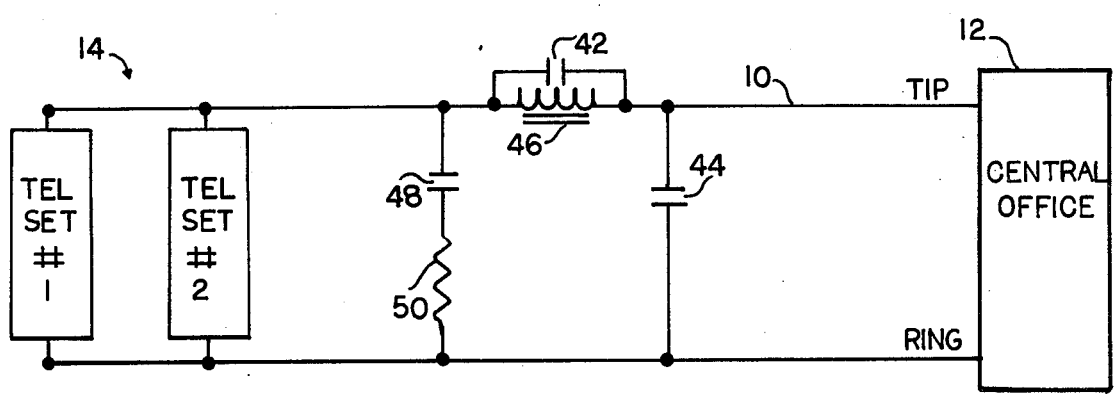
FIG. 4 is a simplified partial electrical schematic diagram of an abbreviated dialing system of the present invention.

Referring now to FIG. 4, a simplified schematic diagram depicts the actual electrical components which form the basic elements of filter means 18. Capacitors 42 and 44 and inductor 46 are the electrical elements which form the low pass filter network of filter means 18. Since this low pass filter presents a high impedance to the Touch Tone generators of telephone instruments 14, capacitor 48 and resistor 50 are inserted on the input side of the low pass filter to provide a low impedance load to insure proper operation of the telephone instrument Touch Tone generators. FIG. 4 illustrates the low pass filter inserted in series with telephone line 10.

Figure 5:
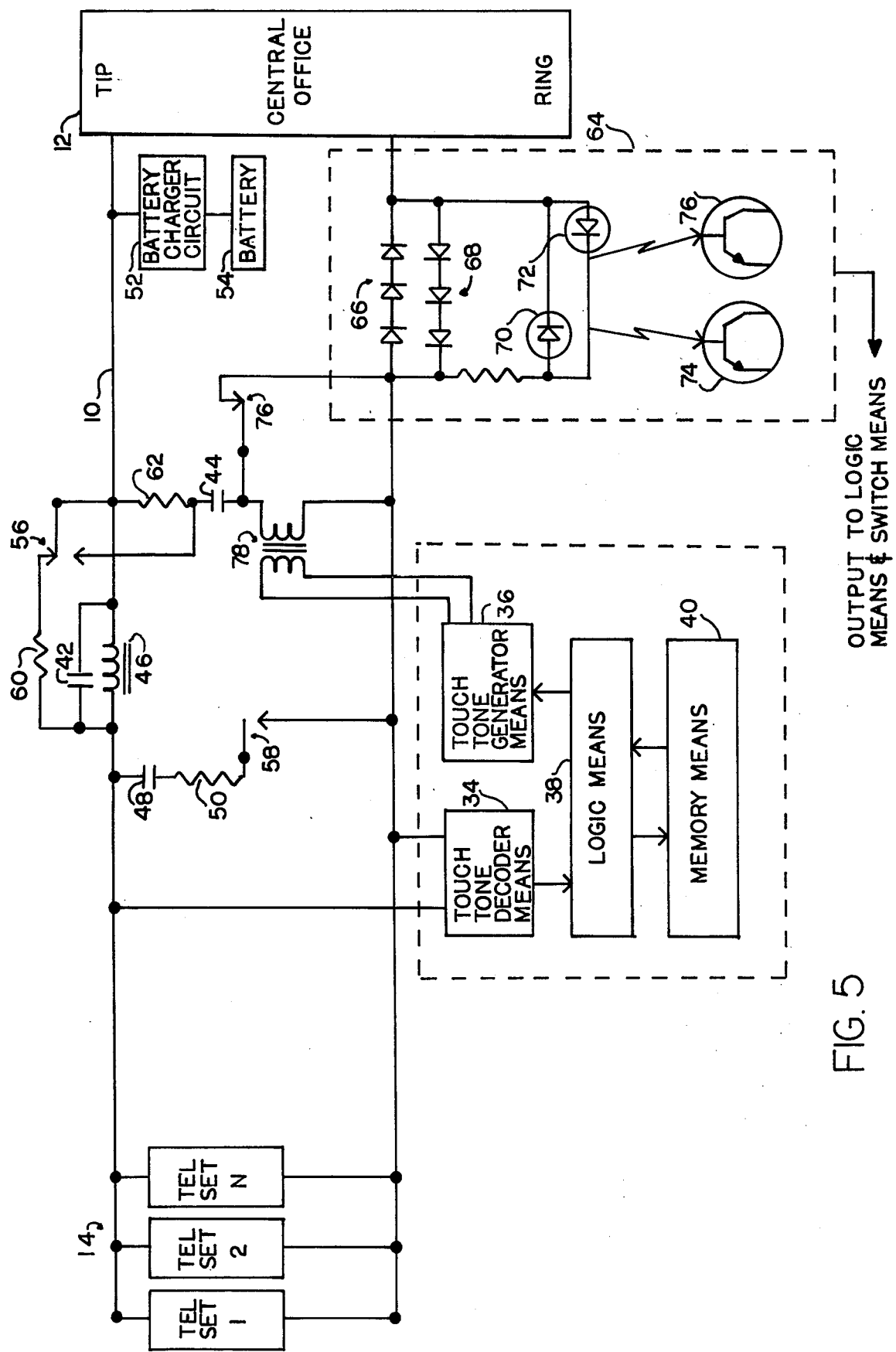
FIG. 5 is a partial electrical schematic diagram of several important elements of an abbreviated dialing system of the present invention, showing more specifically how the system interfaces with the telephone line from the central office to a subscriber's telephone instruments.

Referring now to FIG. 5, a more detailed schematic diagram of the novel elements of the abbreviated dialing system are shown. A battery charging circuit 52 is coupled to a telephone line 10 for the purpose of charging a battery 54. Since a DC voltage is continuously present on telephone line 10 it is always possible for battery circuit 52 to draw between 2 to 4 milliamperes of current in order to recharge battery 54 after it has been partially discharged by actuation of the abbreviated dialing system.

Switches 56 and 58 are controlled by a single electrical relay and serve as switch means 32. FIG. 5 illustrates these two switches in a first position which corresponds to having switch means 32 in the short circuit condition and filter means 18 bypassed.

In FIG. 5 the relay controlling switches 56 and 58 is shown in the unpowered or fail safe position. Thus if the abbreviated dialing system becomes inoperative for some reason or if its battery full discharges, the system is automatically removed from telephone line 10 and will not interfere with the normal manual operation of subscriber telephone instrument 14.

| FIG. 5 COMPONENT VALUES | |
|---|---|
| Component Number | Component Value |
| 42 | .02 mfd. |
| 44 | .10 mfd. (distant) |
| | 2.20 mfd. (close) |
| 46 | 1.50 mH. |
| 48 | .33 mfd. |
| 50 | 600.00 ohm. |
| 60 | 10.00 ohm. |
| 62 | 1.00 megohm |

The value of capacitor 44 may be reduced as the distance from the telephone central office is increased in order to increase the filter frequency response peak at the dial tone frequency. This modification reduces the overall attenuation of the dial tone frequency caused by increased separation of a subscriber from the central office. The value of capacitor 44 can readily be altered by a telephone installer since a multicontact switch is provided to rapidly switch between various values of capacitor 44.

Resistors 60 and 62 prevent damage to the contacts of switch 56 resulting from excessive current flows. Resistor 60 limits the discharge current from capacitor 42 and inductor 46 and resistor 62 permits the charge on capacitor 44 to gradually build up and prevents high current from flowing when switch 56 switches into its second position.

The circuitry which performs the function of off hook sensing means 28 and ring signal sensing means 30 appears within the box designated by reference number 64. Three diodes 66 are coupled in series with one side of the two conductor telephone line 10. A second set of three diodes 68 is coupled in parallel with the first plurality of diodes 66, but with an opposite polarity. When one of the telephone instruments 14 is taken off hook, a direct current flows through telephone line 10 causing a 1.8 volt drop across one of the series connected diode sets. This 1.8 volt drop will illuminate either LED 70 or 72, each of which is coupled with an opposite polarity across diode sets 66 and 68. The illumination of one of these LEDs is detected by either phototransistor 74 or 76. LED's 70 and 72 and phototransistors 74 and 76 form two optical couplers. Illumination of a single LED generates an output current from one of the optical couplers. This output is coupled to switch means 32. The presence of a single output from box 64 indicates to switch means 32 that a direct current is flowing in telephone line 10 and that therefore one of telephone instruments 14 must be off hook.

When an alternating current ringing voltage is present on telephone line 10, a voltage is alternately developed across diode string 66 and then diode string 68. This alternating voltage across the diode strings causes LED's 70 and 72 to alternately illuminate as the AC ring voltage shifts polarity. The presence of a ringing voltage causes both photo transistors 74 and 76 to generate an output current which is transmitted to switch means 32 and indicates that a ringing voltage is present on the telephone line 10. Switch means 32 prevents filter means 18 from being switched into the telephone line if a telephone instrument is taken off hook within six seconds after any ring signal. Conversation is thus permitted since filter means 18 is removed from the telephone line.

While off hook sensing means 28 and ring signal sensing means 30 have been illustrated as a plurality of diodes and two optical couplers, a relay having its coil connected in series with telephone line 10 will function equally well. Furthermore, numerous other circuits could be provided to accomplish this same function, including means for measuring the voltage differential across filter means 18. The system illustrated in FIG. 5 has been utilized in the preferred embodiment since it is inexpensive and highly reliable.

Relay controlled switch 76 is normally maintained in the position illustrated in FIG. 5 which effectively disconnects audio transformer 78 from the circuit. When logic means 38 is prepared to generate a digital output signal to cause Touch Tone generator 38 to generate a series of Touch Tone frequencies, logic means 38 transmits a signal which causes relay powered switch 76 to open and insert transformer 78 in the circuit. The sequence of rapidly generated Touch Tone frequencies generated by Touch Tone generator 36 are thus coupled thru capacitor 44 and the actuated contacts of switch 56 to telephone line 10. Immediately upon termination of the transmission of this Touch Tone signal from Touch Tone generator 36, relay controlled switches 56, 58 and 76 are deactivated and resume their normal position as illustrated in FIG. 5.

It will be apparent to those skilled in the art that the disclosed abbreviated dialing system may be modified in numerous ways and may assume many embodiments other than the preferred form specifically set out and described above. Numerous other low pass or notch filter configuration could be implemented which would effectively perform the desired function of filter means 18. For example, the LC network formed by capacitor 42 and inductor 46 could be implemented in a balanced mode having an additional capacitor 42 and an inductor 46 connected in series with the second telephone line conductor. In this configuration the value of both capacitor 42 and inductor 46 would have to be reduced by a factor of one-half. Accordingly, it is intended by the appended claims to cover all such modifications of the invention which fall with the true spirit and scope of the invention.

The off hook sensor 28, ring sensor 30, Touch Tone decoder 34 and Touch Tone generator 36 may employ circuitry notoriously well known to those skilled in the telephony art. Similarly, the logic and memory circuits 38 and 40 may employ digital formatting, storage and reformatting techniques well known in the electronics art. As has been noted above the essential function of the logic and memory circuits 38 and 40 is to recognize a properly coded abbreviated Touch Tone signal (or any other equivalent multifrequency signal) and call up a full sequence dialing signal stored in memory responsive thereto. This may be accomplished with conventional random access memories (RAM's) and input/output logic customarily employed with these devices.

"Touch Tone" is a registered trademark of the Bell Telephone Company; any other equivalent multifrequency signaling system could be used to control the present invention.

I claim:

1. Apparatus colocated with a subscriber's telephone instrument in a telephone system characterized by a central office coupled to said instrument by a signal transmission link, said system including means for transmitting dial tone, status and ringing signals along said signal link at frequencies at or below 620 Hertz, said instrument including means for transmitting multifrequency dialing signals of frequencies substantially in excess of 620 Hertz along said signal link representative of a telephone number being called from said instrument, said apparatus comprising a filter coupled in said signal link for attenuating only selected multifrequency dialing signals.

2. Apparatus for use with a telephone system of the type employing a central office coupled to a telephone instrument by line conductors, said system further including means for transmitting dial tone, call status and ringing signals along said line conductors from said central office to said instrument, said instrument further including means for transmitting multifrequency dialing signals along said line conductors, each multifrequency dialing signal being representative of a single digit of a telephone number being called, said apparatus comprising:

a. first means coupled to said line conductors between said instrument and said central office for permitting transmission of said dial tone, call status and ringing signals along said line conductors and for suppressing transmission of selected groups of said multifrequency dialing signals along said line conductors; and b. second means coupled with said first means for decoding said selected groups, generating corresponding full sequence groups of multifrequency dialing signals, and thereafter transmitting said full sequence groups along said line conductors to said central office.

3. Apparatus as recited in claim 2, wherein said first means comprises a filter.

4. Apparatus as recited in claim 3, wherein said filter comprises means for supressing signals along said line conductor substantially in excess of 620 Hertz.

5. Apparatus as recited in claim 2, wherein said first means includes means permitting transmission of direct current along said line conductors from said central office.

6. Apparatus as recited in claim 5, wherein said second means comprises:
   a direct current power source; and
   means for changing said direct current power source from direct current from said central office.

7. Apparatus as recited in claim 2, wherein said instrument includes plural switching means for initiating each said multifrequency dialing signal and multifrequency signalling means coupled with said instrument for initiating operation of said second means responsive to detection of operation of a preselected one of said switching means.

8. Apparatus for use with a telephone system of the type employing a central office coupled to a telephone instrument by line conductors, said system further including means for transmitting dial tone, call status and ringing signals along said line conductors from said central office to said instrument, said instrument further including means for transmitting multifrequency dialing signals along said line conductors, each multifrequency dialing signal being representative of a single digit of a telephone number being called, said apparatus comprising:
   a. first means coupled in series with the line conductor for suppressing the transmission of selected groups of multifrequency dialing signals from the instrument to the central office; and
   b. processor means coupled with said first means for decoding the selected groups of multifrequency signals, generating corresponding full sequence groups of multifrequency signals and transmitting the full sequence signals along the line conductors to the central office.

9. In a telephone system employing a central office connected to a telephone instrument by line conductors, an abbreviated dialing system for generating a full sequence group of multifrequency signals in response to an abbreviated group of multifrequency signals transmitted by a telephone instrument coupled to the line conductors, the full sequence group of multifrequency signals being responsive to the telephone number being called, said system comprising:
   a. filter means coupled to the line conductors extending between the instrument and the central office for preventing the transmission of selected multifrequency signals from the instrument to the central office; and
   b. logic means coupled to said filter means and to the line conductors for inserting said filter means in series with the line conductors in response to a selected multifrequency signal, for decoding the abbreviated group of multifrequency signals and for generating on the line conductor a full sequence group of multifrequency signals in response to the abbreviated group of multifrequency signals.

10. The abbreviated dialing system of claim 9 wherein said logic means further includes filter control means for connecting said filter means in series with the line conductors when the instrument is taken off hook for the purpose of making a call and for disconnecting said filter means from the line conductors after a full sequence group of multifrequency signals has been generated by said logic means.

11. The abbreviated dialing system in claim 10 wherein said filter control means disconnects said filter means from the line conductor when an unabbreviated group of multifrequency signals is transmitted from the instrument.

12. The abbreviated dialing system of claim 10 wherein said filter control means includes ring signal sensing means for disconnecting said filter means from the line conductors when the instrument is taken off hook within a predetermined time after a ring signal is detected.

13. The abbreviated dialing system of claim 9 wherein said filter means passes direct current, ring signals and dial tone signals from the central office to the instrument.

14. The abbreviated dialing system of claim 9 wherein said filter means attenuates only a single frequency component of each multifrequency signal.

15. The abbreviated dialing system of claim 14 wherein said filter means attenuates only high band multifrequency signals.

16. The abbreviated dialing system of claim 14 wherein said filter means attenuates only low band multifrequency signals.

17. The abbreviated dialing system of claim 9 wherein said filter means attenuates both low and high band multifrequency signals.

18. The abbreviated dialing system of claim 9 wherein said filter means attenuates all frequencies above the dial tone frequency.

19. The abbreviated dialing system of claim 9 wherein said filter means is a low pass filter which transmits all frequencies below the lowest frequency component of the multifrequency signals.

20. The abbreviated dialing system of claim 9 wherein said filter means is a notch filter for attenuating selected components of the multifrequency signals.

21. The abbreviated dialing system of claim 9 wherein said logic means includes off hook sensing means.

22. The abbreviated dialing system of claim 9 wherein said logic means includes ring signal sensing means.

23. The abbreviated dialing system of claim 9 wherein said logic means further includes filter control means for connecting said filter means in series with the line conductors when the instrument is taken off hook for the purpose of making a call and for disconnecting said filter means from the line conductors when the instrument is taken off hook within a predetermined time after a ring signal is detected.

24. The abbreviated dialing system of claim 9 wherein said logic means includes decoder means for converting each multifrequency signal generated by the instrument into a digital signal representative of each said multifrequency signal.

25. The abbreviated dialing system of claim 24 wherein said logic means further includes multifrequency signal generating means for converting a digital output signal from said logic means into the full sequence group of multifrequency signals.

26. The abbreviated dialing system of claim 9 wherein said logic means includes memory means for storing in selected addresses digital signals representative of full sequence groups of multifrequency signals.

27. The abbreviated dialing system of claim 10 wherein said filter control means further includes switch means for selectively switching said filter means into and out of the circuit formed by the line conductors.

28. An abbreviated dialing system for generating a full sequence group of multifrequency signals in response to an abbreviated dialing command from any one of a plurality of subscriber telephone instruments coupled to line conductors from a telephone central office, the full sequence group of multifrequency signals being representative of the telephone number being called, said system comprising:
   a. filter means coupled to the line conductors extending between a telephone instrument and the telephone central office for substantially attenuating the amplitude of multifrequency signals transmitted from the telephone instrument to the central office while simultaneously passing direct current, ring signals and dial tone signals from the telephone central office to the telephone instrument;
   b. logic means coupled to said filter means and including:
      i. decoder means for converting incoming multifrequency signals from the telephone instrument into digital input signals;
      ii. processor means responsive to the digital input signals for generating digital output signals corresponding to the particular full sequence group of multifrequency signals designated by an abbreviated dialing command transmitted from the telephone instrument;
      iii. encoder means for converting the digital output signals from said processor means into the full sequence group of multifrequency signals designated by the abbreviated dialing command and representative of the telephone number being called; and
   c. control means coupled to said logic means and to said filter means for connecting said filter means in series with the line conductors when an abbreviated dialing command is transmitted from the telephone instrument.

29. Apparatus colocated with a subscriber's telephone instrument in a telephone system characterized by a central office coupled to said instrument by a signal transmission link, said system including means for transmitting dial tone, status and ringing signals along said signal link at frequencies at or below 620 Hertz, said instrument including means for transmitting multifrequency dialing signals of frequencies substantially in excess of 620 Hertz along said signal link representative of a telephone number being called from said instrument, said apparatus comprising:
   a. a filter coupled in said signal link for attenuating only selected multifrequency dialing signals; and
   b. switch means coupled with said filter means for switching said filter means in and out of the signal link.

* * * * *